United States Patent [19]

Sakakibara et al.

[11] Patent Number: 4,679,129
[45] Date of Patent: Jul. 7, 1987

[54] SERIES RESONANT CONVERTER

[75] Inventors: Kazuhiko Sakakibara, Tokorozawa; Yutaka Kuwata, Kodaira, both of Japan

[73] Assignee: Nippon Telegraph and Telephone Corporation, Tokyo, Japan

[21] Appl. No.: 859,680

[22] Filed: May 5, 1986

[30] Foreign Application Priority Data

May 10, 1985 [JP] Japan ................................. 60-98997
Mar. 3, 1986 [JP] Japan ................................. 61-45725
Apr. 28, 1986 [JP] Japan ................................. 61-99807

[51] Int. Cl.$^4$ .......................................... H02M 3/335
[52] U.S. Cl. ........................................ 363/17; 363/40; 363/98
[58] Field of Search ..................... 363/17, 39, 40, 98, 363/132

[56] References Cited

U.S. PATENT DOCUMENTS 4,263,642 4/1981 Simmons et al. ..................... 363/17

FOREIGN PATENT DOCUMENTS 0123369 7/1983 Japan ..................................... 363/17

Primary Examiner—Patrick R. Salce
Assistant Examiner—Emanuel Todd Voeltz
Attorney, Agent, or Firm—Pollock, Vande Sande & Priddy

[57] ABSTRACT

A series resonant converter is disclosed, in which a series resonant circuit consisting of a resonant capacitor and a resonant inductor is connected in series with AC input terminals of a rectifier. Positive current and negative current are alternately caused to flow from a power supply through the series combination of the series resonant circuit and rectifier through on-off control of a plurality of switch elements, thereby obtaining a DC voltage from the rectifier. A parallel resonant circuit is provided in series with the series resonant circuit. The resonant frequency of the parallel resonant circuit is lower than the resonant frequency of the series resonant circuit and higher than the audible frequency range.

20 Claims, 17 Drawing Figures

FIG. 1 PRIOR ART
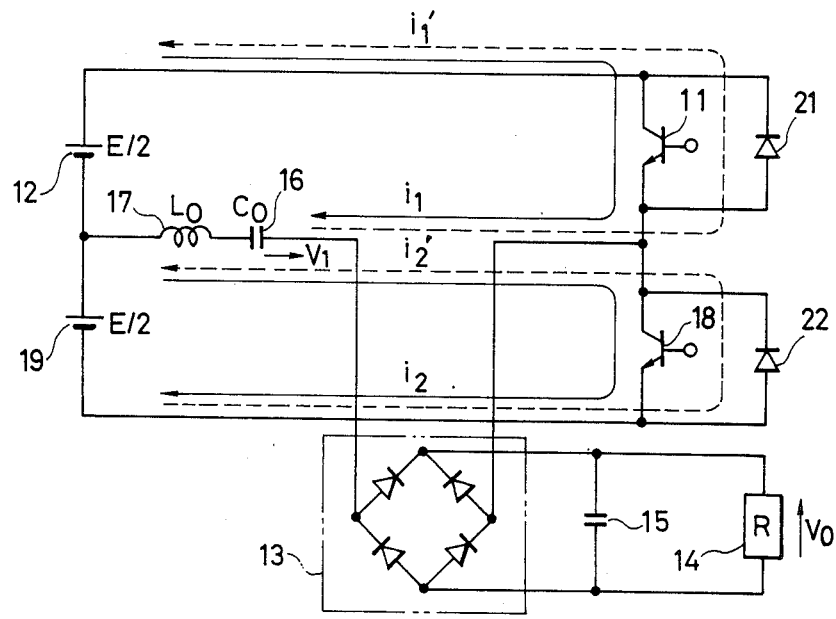
PRIOR ART
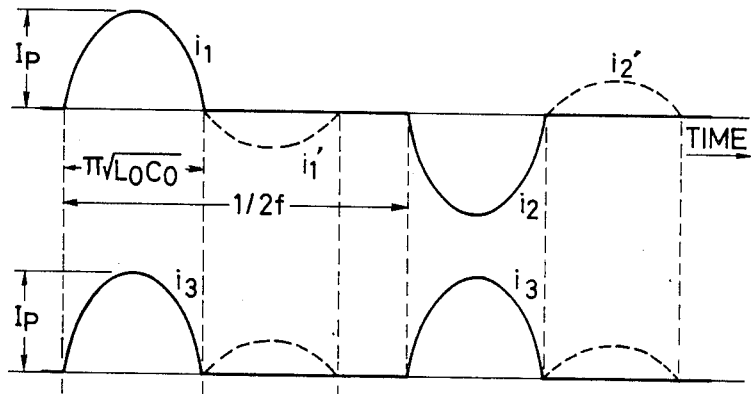
FIG. 2A
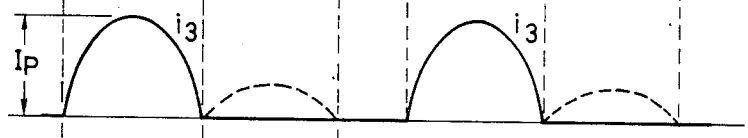
FIG. 2B
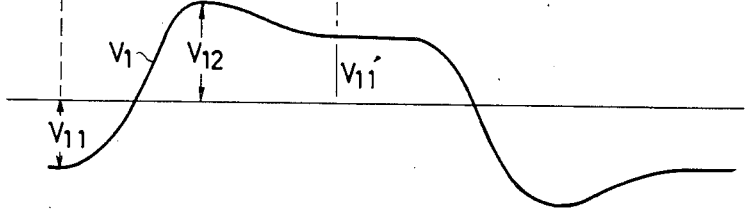
FIG. 2C

SERIES RESONANT CONVERTER

BACKGROUND OF THE INVENTION

This invention relates to a series resonant converter, which comprises a series resonant circuit, a rectifier in series therewith and a semiconductor switch and, the series resonant converter being operative to convert a DC voltage into a different DC voltage supplied to a load.

A series resonant converter usually has two resonant loops each of which comprises a series resonant circuit consisting of an inductor and a capacitor, a rectifier connected in series with the series resonant circuit and a switch element, e.g., a bipolar transistor (or MOS transistor) or a diode. The resonant current flowing through the switch element has a sinusoidal waveform which naturally goes through zero, so that the switch element need not forcibly turn the current off. Theoretically, therefore, there is no switching loss. Thus, less noise is produced, and it is possible to readily construct the converter so that it is operable at a high frequency. In addition, it can be expected to obtain a noise-free, small size and light weight converter. Further, the output characteristics of the series resonant circuit are essentially constant current characteristics. Therefore, the converter system can be readily protected when there occurs an overload or a short-circuit in the load.

FIG. 1 shows a prior art series resonant converter which is disclosed in, for instance, W. Mc Murray, "The Thyristor Electronic Transformer: A Power Converter Using a High Frequency Link", IEEE Transaction on IGA, No. 4, PP. 451-457. FIGS. 2A, 2B and 2C are waveform diagrams illustrating the operation of the converter.

Referring to FIG. 1, a reference numeral 11 designates a semiconductor switch, which is a transistor and serves as a switch element. When semiconductor switch 11 is turned on by application of a gate signal to the gate of transistor 11, series resonant current $i_1$ (shown by solid line) is caused to flow through a series resonant loop extending from power supply 12 through semiconductor switch 11, rectifier 13, load 14 (capacitor 15), then rectifier 13 again, then capacitor 16 and inductor 17 to return to power supply 12. This series resonant current $i_1$ is sinusoidal as shown in FIG. 2A. Denoting the inductance of inductor 17 by $L_0$, the capacitance of capacitor 16 by $C_0$ and the capacitance of capacitor 15 by $C_{0t}$, since $C_{0t} >> C_0$, the resonant current $i_1$ becomes zero at a time $\pi\sqrt{L_0 C_0}$ after it has been caused to flow. At that time the voltage $V_1$ across capacitor 16 assumes a peak voltage $V_{12}$. When the peak voltage $V_{12}$ is higher than the sum of output voltage $V_0$ (i.e., the voltage across load 14) and voltage $E/2$ of power supply 12 at this time, as shown in FIG. 2C, a reverse curent $i_1'$ as shown by dashed line in FIG. 2A is caused to flow through diode 21. This current $i_1'$ again is a series resonant current through inductor 17 and capacitor 16 and after a period $\pi\sqrt{L_0 C_0}$ from its state, turns to zero. The gate signal is arranged to have a duration longer than $\pi\sqrt{L_0 C_0}$ and shorter than $2\pi\sqrt{L_0 C_0}$. Therefore, the gate signal having been applied to transistor 11 is removed within the period of current $i_1'$, preventing generation of further resonant current after the cessation of $i_1'$. The currents $i_1$ and $i_1'$ are full-wave rectified through rectifier 13 so that current $i_3$ flows through capacitor 15 for filtering as shown in FIG. 2B. Capacitor 15 continuously supplies a DC voltage across load 14.

Reference numeral 18 designates another semiconductor switch, which also is a transistor and serves as a switch element. When semiconductor switch 18 is turned on, series resonant current $i_2$ (shown by solid line) is caused to flow through a series resonant loop extending from power supply 19 through inductor 17, capacitor 16, rectifier 13, load 14 (capacitor 15), then rectifier 13 again, and then semiconductor switch 18 to return to power supply 19. This series resonant current $i_2$ is shown in FIG. 2A. After $i_2$ has once become zero, current $i_2'$ flows through diode 22. Rectifier 13 rectifies these currents $i_2$ and $i_2'$ to provide current $i_3$ (FIG. 2B) for charging capacitor 15 for filtering. That is, capacitor 15 supplies a DC voltage to load 14. In the above operation currents $i_1$ and $i_2$ are series resonant currents equal in magnitude and opposite in polarity to each other. Similarly, series resonant currents $i_1'$ and $i_2'$ are equal in magnitude and opposite in polarity to each other.

Since the currents which are caused to flow through semiconductor switches 11 and 18 are series resonant currents, they extinguish themselves to zero a time $\pi\sqrt{L_0 C_0}$ after the semiconductor switches 11 and 18 have been turned on. Therefore, there is no need to forcibly switch off the currents through semiconductor switches 11 and 18, that is, there is inherently no switching loss. It is thus possible to obtain a high frequency operation.

In this prior art series resonant converter, the quantity of charge transmitted to the load through rectifier 13 can be calculated from changes in the voltage across capacitor 16. Referring to FIG. 2C which shows the waveform of the voltage $V_1$ across capacitor 16, normally $|V_{11}| = |V_{11}'|$, where $V_{11}$ is the voltage across capacitor 16 before the resonant current is caused to flow through one of switches 11 and 18, and $V_{11}'$ is the voltage across capacitor before the next resonant current is caused to flow through the other switch. Quantity $Q_0$ of charge that is transferred to the load per half cycle period is thus $$Q_0 = C_0\{(V_{11}+V_{12})+(V_{12}-V_{11}')\} = 2C_0 V_{12} \tag{1}$$

where $V_{12}$ is the peak voltage across capacitor 16. Average value $I_3$ of current $i_3$ shown in FIG. 2B is $$I_3 = Q/(\tfrac{1}{2}f) = 4C_0 V_{12} f \tag{2}$$

where f is the operating frequency, at which semiconductor switches 11 and 18 are alternately turned on. Normally, the voltage across filter capacitor 15 is fixed, so that current $I_3$ is entirely supplied to load 14. Output voltage $V_0$ is thus $$V_0 = R \cdot I_3 = (4C_0 V_{12} f) \cdot R \tag{3}$$

where R is the resistance of load 14.

From equation (3) it will be seen that output DC voltage $V_0$ can be controlled through control of either $C_0$, $V_{12}$ or f. At present, it is difficult to continuously control $C_0$. Peak voltage $V_{12}$ is normally clamped by power sources 12 and 19 to $E/2$ in stationary states for there are feedback currents $i_1'$ and $i_2'$ through diode 21 or 22 in parallel with semiconductor switch 11 or 18. Voltage $V_{12}$, therefore, can not be controlled unless the voltages of power sources 12 and 19 are varied. Usually, therefore, the voltage control of $V_0$ to a constant voltage is effected through control of operating frequency f.

Although not shown in the drawings, it is conventionally arranged that a gate signal generating circuit generates two gate signals of a frequency f and 180° out of phase from each other which are supplied to the respective gates of switches 11 and 18, and the output voltage $V_0$ is fed back to the signal generating circuit to control the frequency f of the gate signals so as to maintain the output voltage $V_0$ constant. Therefore, frequency f lowers as resistance R increases, as will be seen from equation (3), and in the case of light load operation, the frequency may easily enter an audio frequency range. For example, if operating frequency f is 100 kHz under the rated current (100% load) condition, a load reduction to 20% load or less would cause the frequency f to become lower than 20 kHz, giving rise to noisy sounds. It has been difficult to cope with the noise because the operating frequency changes with the load.

FIG. 3 shows a series resonant converter proposed in Electronic Engineering, September 1981, page 39 to solve the problems discussed above. In this proposed series resonant converter, a series circuit consisting of the primary winding of transformer 27 and capacitor 16 is connected between the junction of switch elements 11 and 18 and one terminal of inductor 17. DC power sources 12 and 19 are connected between the other terminal of inductor 17 and the other terminals of respective switch elements 11 and 18. Capacitor 44 is connected in parallel with the secondary winding of transformer 17, and rectifier 13, inductor 20 and load 14 are connected in series with the secondary winding of transformer 27. A feature of this prior art converter resides in that the switching frequency, at which switch elements 11 and 18 are turned on and off, is set variable in a higher frequency range than resonant frequency $f_0 = 1/(2\pi\sqrt{L_0 C_0})$ based on inductance $L_0$ of inductance 17 and capacitance $C_0$ of capacitor 16. The current in the series resonant circuit at a frequency higher than $f_0$ is inversely proportional to the frequency. Therefore, it is possible to obtain constant voltage control through switching frequency control such that the switching frequency is increased with reducing load current and reduced with increasing load current in a range above $f_0$. Thus, it is possible to eliminate noise by selecting $f_0$ to be above the audible frequency range. However, since the switching frequency is above $f_0$, switch element 11 or 18 can not be made to turn on after the resonant current through inductor 17 has become zero. In other words, a suddenly increasing switching current is caused when the switch element is turned on, leading to switching loss increase and noise increase. To reduce noise and also further reduce the switching frequency variation range in this prior art converter, capacitor 44 is connected across the secondary winding of transformer 27, and series inductor 20 is connected between the output of rectifier 13 and one terminal of capacitor 15, whereby a sinusoidal voltage is transmitted to the secondary side of transformer 27. However, a very large reactive current flows through capacitor 44 without being substantially influenced by the load. In other words, a substantial portion of the current flowing through switch elements 11 and 18 under a light load condition is a reactive current flowing through transformer 27 to capacitor 44, so that the efficiency is extremely reduced.

FIG. 4 shows a further well-known series resonant converter. In this converter diodes 21 and 22 are connected in parallel with respective capacitors 41 and 42, DC power supply 43 is applied across the series connection of capacitors 41 and 42, and rectifier 13 is serially connected between the junction of semiconductor switches 11 and 18 and inductor 17. The gates of transistors (i.e. switch elements) 11 and 18 are controlled by gate signals having a frequency and a 50% duty ratio, 180° out of phase from each other. This converter has a feature that the endurable voltage (i.e. breakdown voltage) required for semiconductor switches 11 and 18 and resonant capacitors 41 and 42 may suffice if selected to be higher than the voltage across power supply 43. Moreover, since the effective value of resonant current is small compared to that of the series resonant converter shown in FIG. 1, the loss at switches 11, 18 and rectifier 13 is small and also no switching loss will be caused in contrast with the case of FIG. 3.

The operation of this converter will now be described under the assumption of an initial condition wherein resonant capacitors 41 and 42 have been charged respectively to the voltage of power supply 43 and to zero voltage. FIG. 5 shows waveforms obtained in various parts of the converter of FIG. 4. When semiconductor switch 11 is turned on, charging current $i_1$ flows from power supply 43 through semiconductor switch 11, rectifier 13, load 14 (capacitor 15), then rectifier 13 again, and then resonant inductor 17 to charge resonant capacitor 42. At the same time, discharging current $i_2$ from resonant capacitor 41 flows through semiconductor switch 11, rectifier 13, load 14 (capacitor 15), then rectifier 13 again, and then resonant capacitor 17. Currents $i_1$ and $i_2$ are equal and assume a sinusoidal waveform with a half cycle period $\pi\sqrt{2L_0 C_0}$ as shown in FIG. 5A. They are resonant currents which charge and discharge resonant capacitor 42 as shown in FIG. 5D and discharge and charge resonant capacitor 41 as shown in FIG. 5C. Denoting the voltage across capacitor 15 (i.e., the output voltage) by $V_0$, the inductance of resonant inductor 17 by $L_0$, the capacitance of resonant capacitors 41 and 42 by $C_0$ and the voltage of power supply 12 by E, then the voltages $V_{c1}$ and $V_{c2}$ across resonant capacitors 41 and 42 become respectively zero and E at $t_1$ after the lapse of time of approximately $$-T_1 = \sqrt{2L_0 C_0} \left\{ \pi - \cos^{-1}\left( \frac{V_0}{E - V_0} \right) \right\} \quad (4)$$

from time $t_o$. At this moment $t_1$, diode 21 is turned on, so that the current which has been flowing through resonant inductor 17 now turns to flow as current $i_2'$ shown in FIG. 5B through resonant inductor 17, diode 21, semiconductor switch 11, rectifier 13, load 14 (capacitor 15) and then rectifier 13 again, as shown in FIG. 4. This current $i_2'$ becomes zero after the lapse of time $$T_2 = \sqrt{2L_0 C_0} \sqrt{\frac{E}{V_0}\left(\frac{E}{V_0} - 2\right)} = \frac{i_1(t_1)}{V_0} L_0 \quad (5)$$

from the instant of turning-on of diode 21, thus entering into a cease period which continues until semiconductor switch 11 turns off and switch 18 turns on at $t_3$ to end one half cycle of operation. In the next half cycle, semiconductor switch 18 is turned on at $t_3$ to charge resonant capacitor 41 and discharge resonant capacitor 42.

With the prior art series resonant converter shown in FIG. 1, the output voltage $V_0$ versus output current $I_0$ characteristic is a constant current characteristic as shown in FIG. 6A; that is, output current $I_0$ is substantially constant regardless of reduction of output voltage $V_0$ so long as the operating frequency f is constant. With the series resonant converter shown in FIG. 4, the average of currents $i_1$, $i_2'$ flowing into rectifier 13, i.e. output current $I_0$, is proportional to capacitance $C_0$, operating frequency f and inversely proportional to output voltage $V_0$ as shown in FIG. 6B. Therefore, when $V_0$ is extraordinarily reduced due to such cases as an output short-circuit while operating frequency f is held clamped, $T_2$ (see FIG. 5B) is increased extremely in accordance with equation (5). In this case, the currents through semiconductor switches 11 and 18 no longer extinguish themselves within each half cycle of the operating frequency f, so that it is necessary to forcibly turn off these currents by semiconductor switches 11 and 18, thus leading to problems of noise increase and switching loss increase. When output voltage $V_0$ becomes low because of heavy load, for example, it is necessary to reduce operating frequency f to hold output current $I_0$ within maximum permissible load current Im shown by dashed line 45. Depending on the load condition, the operation frequency enters the audible frequency range $f_A$, thus giving rise to noise.

A primary object of the invention is to provide a series resonant converter which permits to set a lowest allowable frequency to change in the operating frequency relative to load variations and which is free from noise.

A second object of the invention is to provide a series resonant converter which permits constant voltage control for over a range from zero to full load and has a narrow operating frequency range as well as capability of holding the operating frequency above a lowest allowable frequency.

A third object of the invention is to provide a series resonant circuit which can limit the output voltage without noise generation even when the output voltage is extraordinarily reduced due to such causes as an output short-circuit.

SUMMARY OF THE INVENTION

According to a first aspect of the invention, parallel resonant means having a resonant frequency above the audible frequency is connected in series with a rectifier of the series resonant converter, that is, the parallel resonant means is inserted in each series resonant loop. Thus, then the operating frequency is lowered to approach the resonant frequency above the audible frequency range, resonance in the parallel resonant means makes current supplied to a load sufficiently low. The operating frequency will never enter the audible frequency range.

According to a second aspect of the invention, a capacitor is provided in series with the rectifier of the series resonant converter. When the output voltage is extraordinarily reduced, the operating frequency is reduced to limit corresponding output current increase. When the operating frequency is reduced to a predetermined value, series resonance produced by the capacitor noted above and a resonant inductor causes the output current to be automatically cut off at zero crossing of the resonant current. The output current thus will not be extraordinarily increased, so that there is no need to reduce the operating frequency into the audible frequency range.

More specifically, according to the first aspect of the invention a rectifier is provided commonly for a first series resonant loop including a first switch element and a second series resonant loop including a second switch element. Power supply means is provided such that a resonant current is caused to flow through the first series resonant loop through control of the first switch element and a resonant current is caused to flow through the second series resonant loop through control of the second switch element. Further, parallel resonant means is provided for each of the first and second series resonant loops. The resonant frequency of the parallel resonant means is selected to be the lowest operating frequency (higher than the audible frequency range). As for the power supply means, a power supply may be provided for each of or commonly for the first and second series resonant loops. A capacitor or an inductor, or both, may be used commonly for the first and second series resonant loops. In this case, current is caused to flow from the power supply to the first series resonant loop through control of the first switch element, and energy stored at this time is then supplied through the second switch element to the second series resonant loop to cause therein a resonant current. In other words, no power supply may be inserted in the second series resonant loop.

A series resonant capacitor and a series resonant inductor may be provided commonly for or for each of the first and second series resonant loops. Generally, diodes are connected in parallel with the respective first and second switch elements. The resonant current is supplied to the rectifier not only when a switch element is turned on but also when the switch element is turned off.

According to the second aspect of the invention, a rectifier is provided commonly for a first series resonant loop including a first switch element and a second series resonant loop including a second switch element. The first and second switch elements are connected in series, and a power supply is connected across these series switch elements. A diode is connected in parallel with a resonant capacitor of the first series resonant loop such that it has the opposite polarity to the power supply. A second diode is connected in parallel with a resonant capacitor of the second series resonant loop such that it has the opposite polarity to the power supply. A third capacitor is provided for each of or commonly for the first and second series resonant loops. The capacitance of the third capacitor is selected such that the resonant frequency of the circuit consisting of this third capacitor and a resonant inductor of the first or second series resonant loop is sufficiently lower than the series resonant frequency of each series resonant loop.

BRIEF DESCRIPTION OF THE DRAWINGS

FIG. 1 is a circuit diagram showing a prior art series resonant converter of the two power supply type;

FIGS. 2A to 2C are waveform diagrams showing current and voltage waveforms produced in various parts of the converter shown in FIG. 1;

DETAILED DESCRIPTION OF THE PREFERRED EMBODIMENTS

Figure 7:
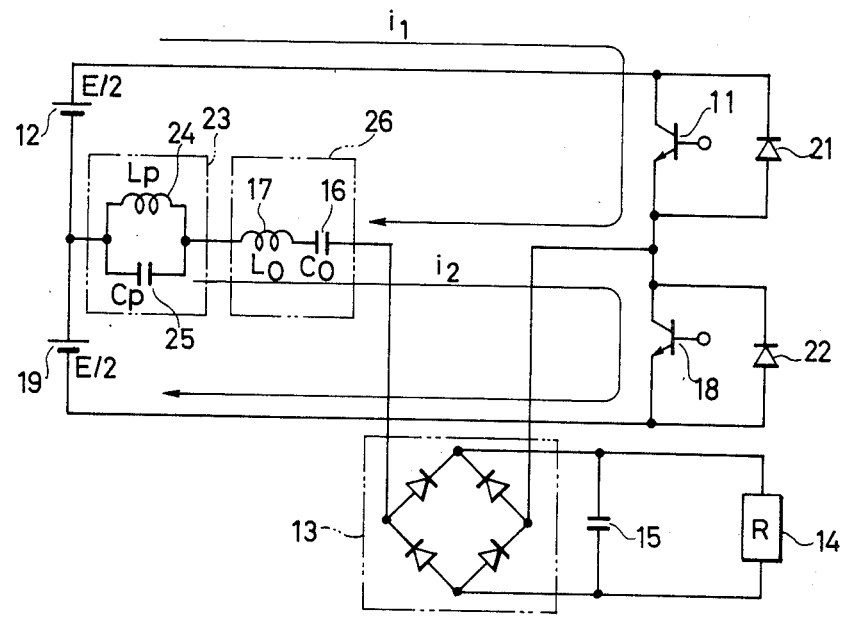
FIG. 7 is a circuit diagram showing an embodiment of a first aspect of the invention applied to the series resonant converter shown in FIG. 1.

FIG. 7 is a circuit diagram showing a first embodiment of a first aspect of the invention. This embodiment of the series resonant converter is an improvement over the prior art series resonant converter shown in FIG. 1 in that parallel resonant circuit 23 consisting of inductor 24 and capacitor 25 is connected in series with series resonant circuit 26 consisting of capacitor 16 and inductor 17. In FIG. 7, parts like those in FIG. 1 are designated by like reference numerals.

Denoting the inductance of inductor 24 in parallel resonant circuit 23 by Lp and the capacitance of capacitor 25 by Cp, resonant frequency $f_p = 1/(2\pi\sqrt{L_p C_p})$ of parallel resonant circuit 23 is set to be sufficiently lower than resonant frequency $f_0 = 1/(2\pi\sqrt{L_0 C_0})$ of series resonant circuit 26 consisting of capacitor 16 and inductor 17 and made to be the lowest operating frequency of the series resonant converter above audible frequency range. The impedance of parallel resonant circuit 23 is maximum at resonant frequency fp and is sharply reduced with increase of the operating frequency f beyond fp. For the operating frequency sufficiently higher than the resonant frequency fp, the operation characteristic of the converter is substantially identical with that of FIG. 1.

When switch element (e.g. semiconductor switch) 11 in FIG. 7 is turned on, current $i_1$ is caused to flow through a loop extending from power supply 12 through semiconductor switch 11, rectifier 13, load 14 (capacitor 15), then rectifier 13 again, then capacitor 16, inductor 17 and parallel resonant circuit 23, whereby power is supplied to load 14. The resonant current $i_1$ of each sinusoidal half cycle has a duration of $\pi\sqrt{L_0 C_0}$ as shown in FIG. 2A. The repetition period of intermittent current $i_1$ through parallel resonant circuit 23 is the operating cycle period 1/f, with which semiconductor switches 11 and 18 are alternately turned on and off. The duration of each of the gate signals for turning on switches 11 and 12 is selected to be longer than $\pi\sqrt{L_0 C_0}$ and shorter than $2\pi\sqrt{L_0 C_0}$. When the operating frequency f is sufficiently higher than the resonant frequency fp of parallel resonant circuit 23, the impedance of parallel resonant circuit 23 is sufficiently low, so that the peak value of current $i_1$ is substantially constant regardless of the operating frequency as in the prior art converter shown in FIG. 1. When the operating frequency approaches the resonant frequency of parallel resonant circuit 23, the impedance of parallel resonant circuit 23 sharply increased to cause a sharp reduction in the peak value of current $i_1$.

Subsequently switch element (e.g. semiconductor switch) 18 is turned on, whereupon resonant current $i_2$ is caused to flow from power supply 19 through parallel resonant circuit 23, inductor 17, capacitor 16, rectifier 13, load 14 (capacitor 15), then rectifier 13 again, and then semiconductor switch 18.

In the above way, one cycle of operation is completed. The impedance of parallel resonant circuit 23, although it is low when the operating frequency f is apart from resonant frequency fp, is sharply increased with approach of the operating frequency to fp. Thus, in the neighborhood of fp, resonant current $i_1$ and therefore output current (i.e. load current), can be controlled by slightly varying the operating frequency.

Figure 8:
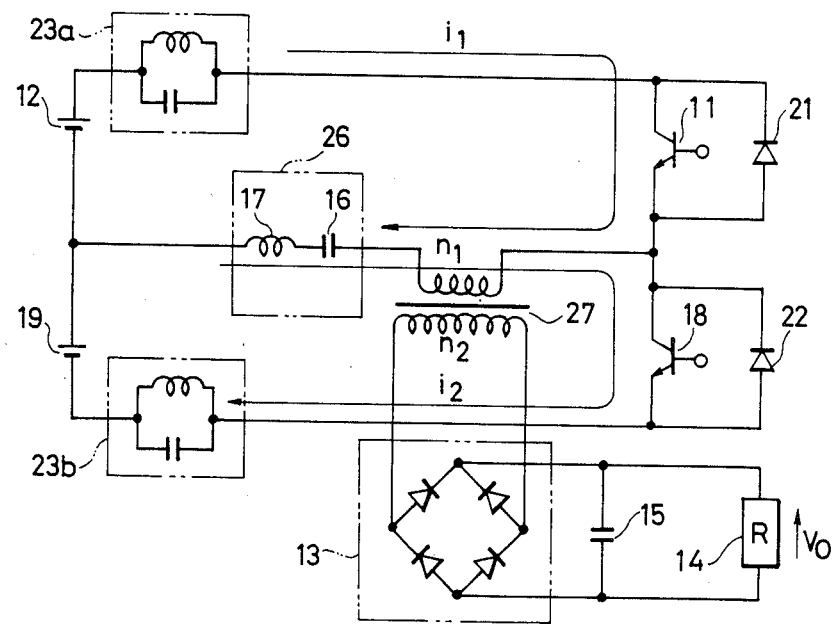
FIG. 8 is a circuit diagram showing another embodiment of the first aspect of the invention applied to the series resonant converter shown in FIG. 1, in which a parallel resonant circuit is provided for each series resonant loop and the DC input and DC output are insulated from each other.

FIG. 8 is a circuit diagram showing a second embodiment, where the invention is applied to a series resonant converter which employs a transformer for insulating DC input and DC output from each other. More specifically, transformer 27 has the primary winding connected in series with series resonant circuit 26 and the secondary winding connected between the AC input terminals of rectifier 13. In other words, series resonant circuit 26 and rectifier 13 are connected in series with each other through transformer 27. In this instance, a parallel resonant circuit is inserted in each of two series resonant loops. More specifically, parallel resonant circuits 23a and 23b are inserted between respective power supplies 12 and 19 and respective semiconductor switches 11 and 18.

The operation of this second embodiment is the same as in the first embodiment shown in FIG. 7. In this second embodiment, the input and output sides can be insulated from each other, and the output voltage can be freely set according to turns ratio $n_1/n_2$ of transformer 27.

Figure 9:
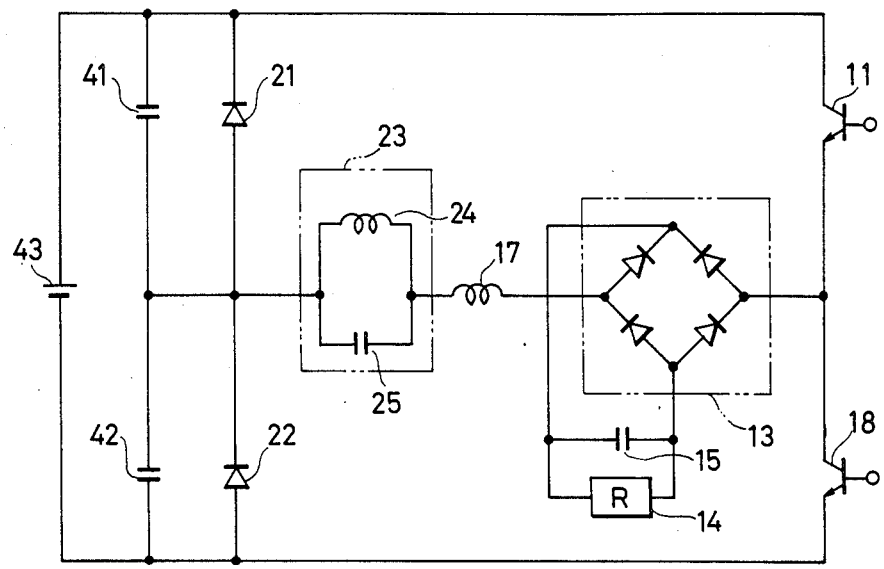
FIG. 9 is a circuit diagram showing a further embodiment of the first aspect of the invention applied to the series resonant converter shown in FIG. 4.

FIG. 9 shows a third embodiment of the series resonant converter. This embodiment is one where the invention is applied to the prior art converter shown in FIG. 4. More specifically, parallel resonant circuit 23 is connected in series with resonant inductor 17 between the connection point between switch elements 11 and 18 and the connection point between capacitors 41 and 42. The operation of this embodiment will be readily understood from the description in connection with FIGS. 4 and 7, so that it will not be described.

Figure 10:
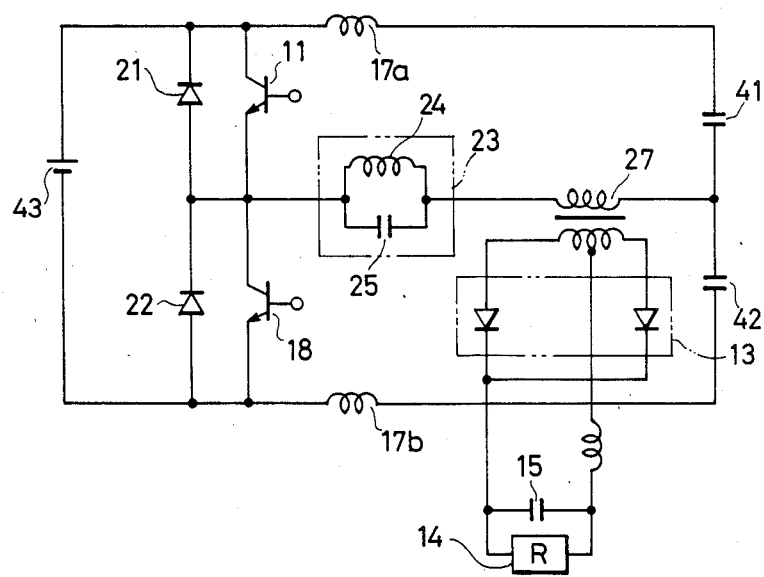
FIG. 10 is a circuit diagram showing a still further embodiment of the first aspect of the invention applied to a prior art forward type series resonant converter.

FIG. 10 shows a fourth embodiment of the series resonant converter. In this embodiment, single power supply 43 and two resonant capacitors 41 and 42 are used. Further, in place of a single resonant inductor common to two series resonant loops, independent resonant inductors 17a and 17b are provided for the respective series resonant loops. Parallel resonant circuit 23 is connected between the connection point between resonant capacitors 41 and 42 and the connection point between switch elements 11 and 18. The operation is similar to that of the converter shown in FIG. 4, and it is readily conceivable that this converter permits clamping of the operating frequency at the resonant frequency of parallel resonant circuit 23 even if the load is extremely reduced.

Figure 11:
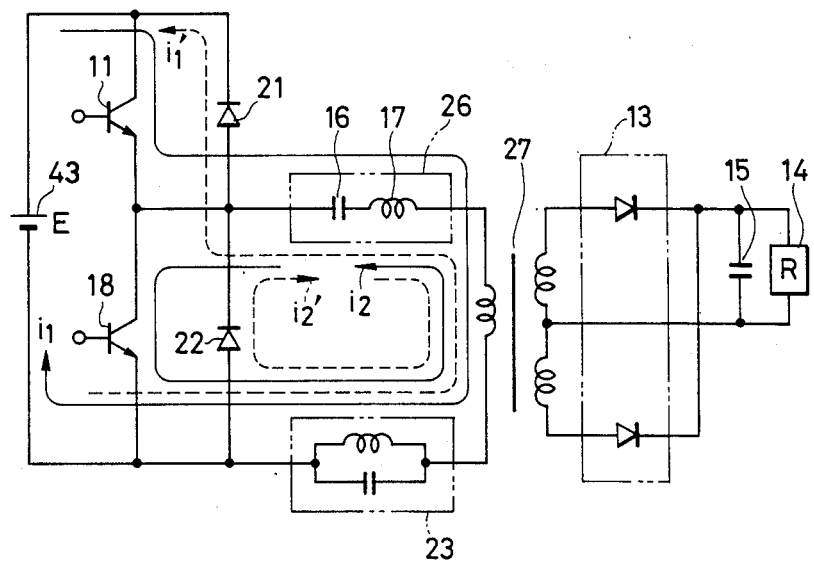
FIG. 11 is a circuit diagram showing yet another embodiment of the first aspect of the invention applied to a series resonant converter, in which energy stored when current is caused through a first series resonant loop is supplied to a second series resonant loop without direct supply of current from power supply to the second series resonant loop.

FIG. 11 shows a fifth embodiment of the series resonant converter. In this embodiment, a series circuit consisting of parallel resonant circuit 23, series resonant circuit 26 and transformer 27 is connected between the connection point between switch elements 11 and 18 and one terminal of power supply 43. When switch element 11 is turned on, resonant current $i_1$ is caused to flow from power supply 43 through series resonant circuit 26, transformer 27 and parallel resonant circuit 23. When resonant current $i_1$ becomes zero, the voltage across resonant capacitor 16 reaches a peak value higher than power supply voltage E. Therefore, resonant current $i_1'$ as shown by dashed line starts flowing through diode 21 to discharge the voltage across capacitor 16 to the voltage E of power supply 43. Switch element 11 is turned off while the current $i_1'$ is flowing. Switch element 18 is subsequently turned on, whereupon capacitor 16 is discharged through switch element 18. At this time, resonant current $i_2$ is caused to flow until resonant capacitor 16 is charged in the opposite direction to a certain extent. After resonant current $i_2$ diminishes to zero, capacitor 16 starts to discharge in the opposite direction, whereby a resonant current $i_2'$ flows through diode 22. Again in this case, resonant currents $i_1$ and $i_2$ can be sufficiently suppressed when the operating frequency becomes the resonant frequency fp of parallel resonant circuit 23 with a load reduction.

Figure 12:
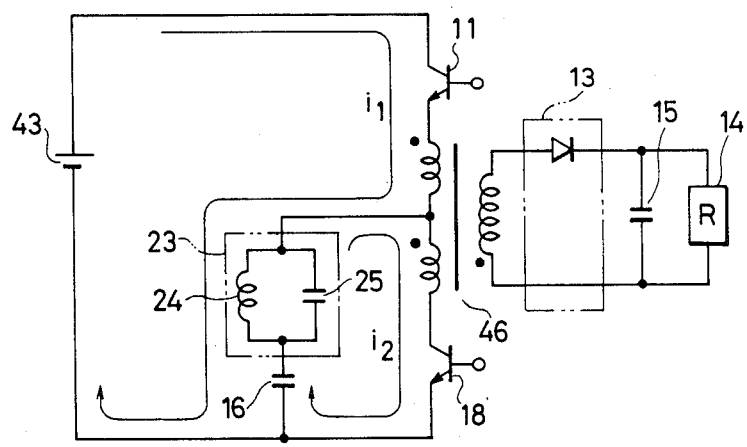
FIG. 12 is a circuit diagram showing a still further embodiment of the first aspect of the invention applied to a prior art flyback type series resonant converter.

FIG. 12 shows a sixth embodiment of the series resonant converter. In this embodiment, the inductance of a transformer is utilized as a series resonant inductor, and energy is initially stored in the transformer before being discharged through rectifier 13 to load 14 (15). More specifically, transformer 46 has a primary winding whose opposite terminals are connected through respective switch elements 11 and 18 to the opposite terminals of power supply 43. A series circuit consisting of resonant capacitor 16 and parallel resonant circuit 23 is connected between a center tap of the primary winding and one of the terminals of power supply 43. When switch element 11 is turned on, series resonant current $i_1$ is caused, which is determined by the primary winding of transformer 46 and resonant capacitor 16. After current $i_1$ becomes zero, switch element 11 is turned off, whereupon capacitor 15 is charged by energy stored in transformer 46 through rectifier 13. When switch element 18 is turned on, resonant capacitor 16 is discharged through transformer 46. At this time, resonant current $i_2$ is caused. When resonant current $i_2$ becomes zero, switch element 18 is turned off, whereupon capacitor 15 is charged by energy stored In transformer 46 through rectifier 13.

Figure 13:
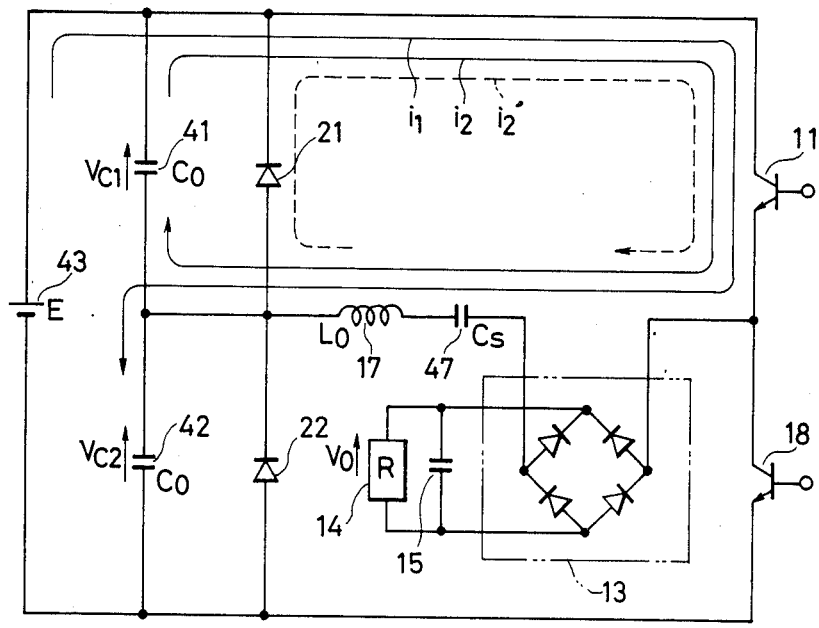
FIG. 13 is a circuit diagram showing an embodiment of a second aspect of the invention.
Figure 14A:
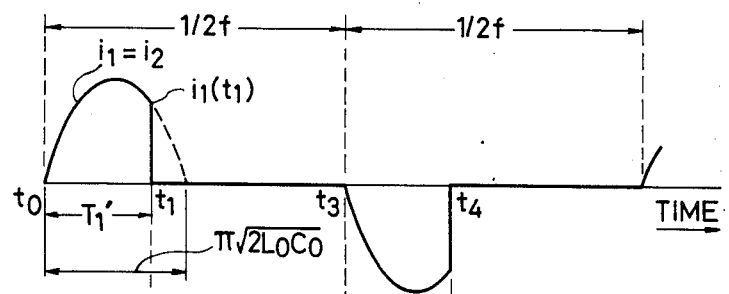
FIG. 14A to 14D are waveform diagrams showing current and voltage waveforms produced in various parts of the converter shown in FIG. 13.
Figure 14B:
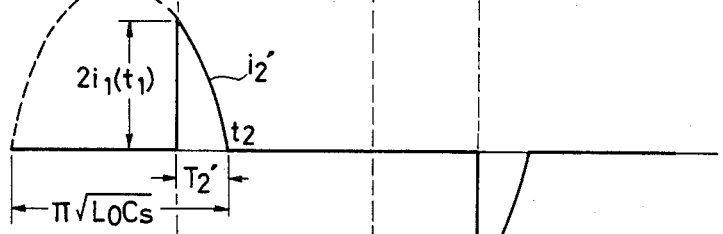
Figure 14C:
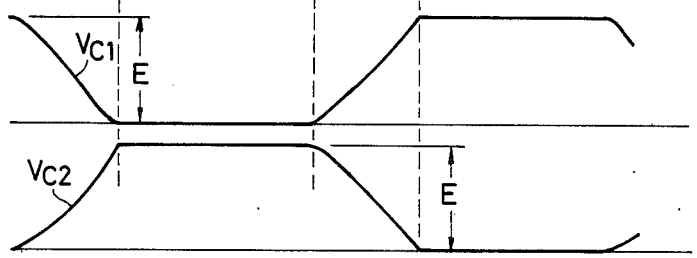
Figure 14D:
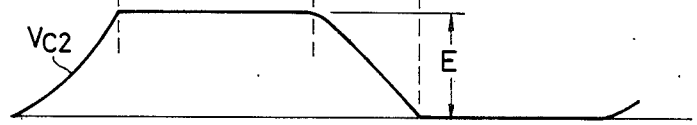

FIG. 13 shows an embodiment according to a second aspect of the invention. This embodiment is an improvement over the prior art series resonant converter shown in FIG. 4 in that third resonant capacitor 47 is connected in series with rectifier 13. As initial conditions, it is assumed that resonant capacitors 41 and 42 each having capacitance $C_0$ have been respectively charged to voltage E of power supply 43 and zero voltage. FIG. 14 shows waveforms produced in various parts of the converter shown in FIG. 13. When semiconductor switch 11 is turned on at $t_0$, resonant current $i_1$ is caused to flow into resonant capacitor 42 from power supply 43 through semiconductor switch 11, rectifier 13, load 14 (capacitor 15), then rectifier 13 again, then third resonant capacitor 47, and resonant inductor 17. At the same time, discharging current $i_2$ is caused to flow from resonant capacitor 41 through semiconductor switch 11, rectifier 13, load 14 (capacitor 15), then rectifier 13 again, then third resonant capacitor 47 and resonant inductor 17. These currents $i_1$ and $i_2$ have the same amplitude as shown in FIG. 14A, each of which, if exterpolated, has a sinusoidal waveform with a half cycle period time of about $\pi\sqrt{2L_0C_0}$. After having charged resonant capacitor 42 to power supply voltage E as shown in FIG. 14D and discharged resonant capacitor 41 to zero voltage as shown in FIG. 14C at $t_1$ i.e., after the lapse of time $T_1'$ from the instant of turning-on of semiconductor switch 11, these currents $i_1$ and $i_2$ are diverted to flow as current $i_2'$ through diode 21. More specifically, when diode 21 in parallel with resonant capacitor 41 is turned on, the current (i.e. $i_1+i_2$) that has been flowing through resonant inductor 17 turns to flow as current $i_2'$ shown in FIG. 14B through resonant inductor 17, diode 21, semiconductor switch 11, rectifier 13, load 14 (capacitor 15), then rectifier 13 again and then third resonant capacitor 47 as shown in FIG. 13. This current $i_2'$ is a resonant current resulting from resonance by resonant inductor 17 and third resonant capacitor 47, and has, if exterpolated, a sinusoidal waveform with a half cycle period time of $\pi\sqrt{L_0C_s}$, and becomes zero after the lapse of time $T_2'$. Time period $T_2'$ can be freely set by suitably selecting capacitance Cs of third resonant capacitor 47.

In the above way, one half cycle of operation is completed. In the next half cycle, semiconductor switch 18 is turned on to charge resonant capacitor 41 and discharge resonant capacitor 42.

Since this embodiment of the converter operates in the manner as described above, when output voltage $V_0$ is reducing, the current through semiconductor switch 11 (or 18) can be forcibly reduced to zero by making use of the resonance between resonant inductor 17 and third resonant capacitor 47 after it has been switched over to diode 21 (or 22), that is, the output current can be sufficiently limited. The output current thus can be sufficiently limited without need of reducing operating frequency to an audible frequency in case of occurrence of an overload or short-circuit.

Figure 15:
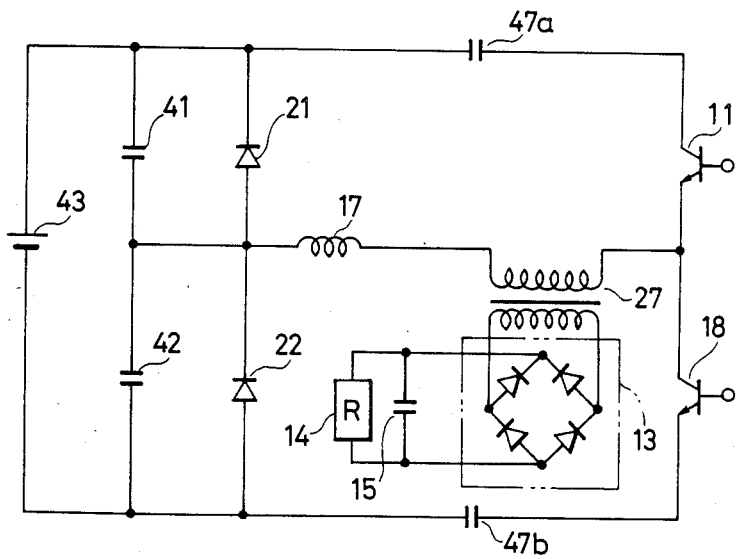
FIG. 15 is a circuit diagram showing another embodiment of the second aspect of the invention.

Third resonant capacitor 47 may be inserted in each series resonant loop independently. FIG. 15 shows an example of such arrangement. More specifically, in this instance semiconductor switch 11 and diode 21 are connected together through third resonant capacitor 47a on one side of power supply 43, while semiconductor switch 18 and diode 22 are connected together through third resonant capacitor 47b on the other side of power supply 43. In this instance, the DC input and DC output are insulated from each other by transformer 27.

Figure 3:
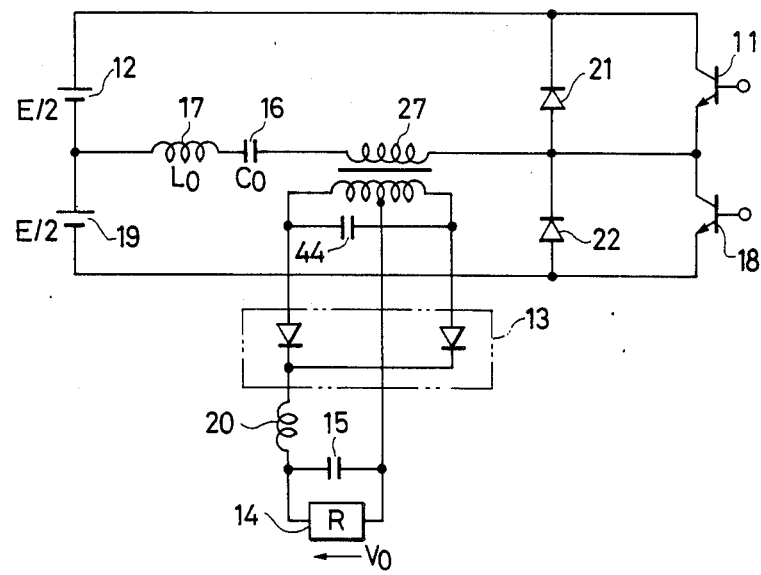
FIG. 3 is a circuit diagram showing a prior art series resonant converter, in which the operating frequency is clamped when the load is reduced.
Figure 4:
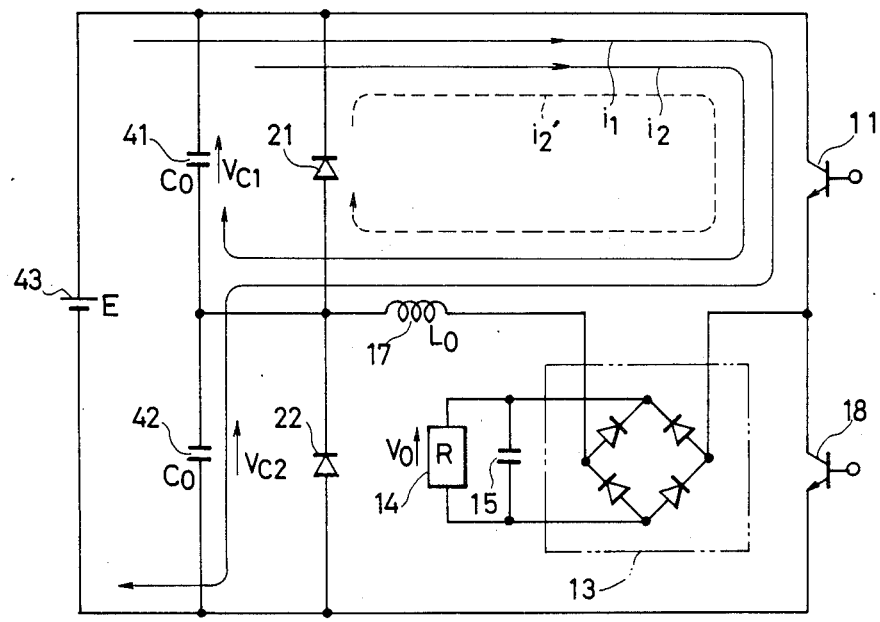
FIG. 4 is a circuit diagram showing a prior art series resonant converter of a different type.
Figure 5A:
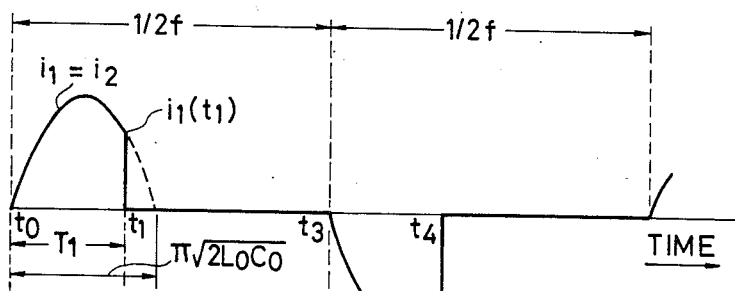
FIGS. 5A to 5D are diagrams showing current and voltage waveforms produced in various parts of the converter shown in FIG. 4.
Figure 5B:
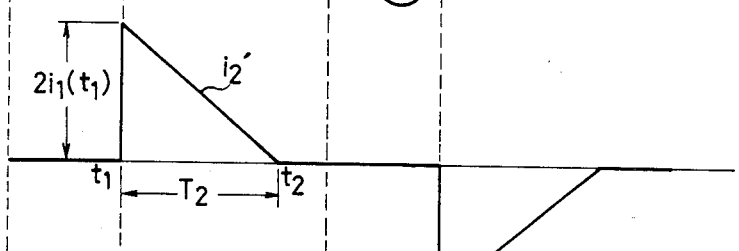
Figure 5C:
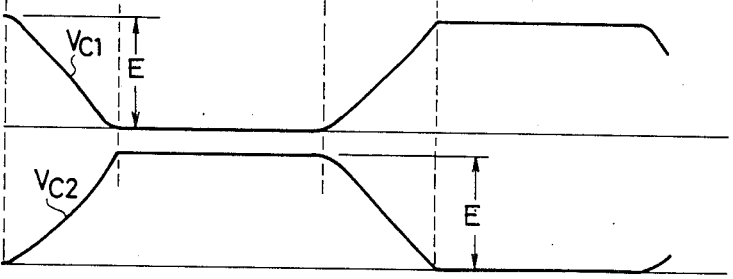
Figure 5D:
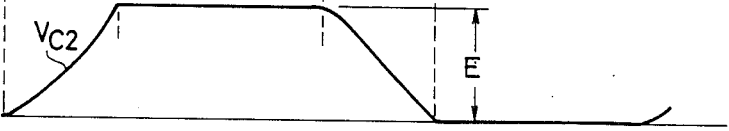
Figure 16:
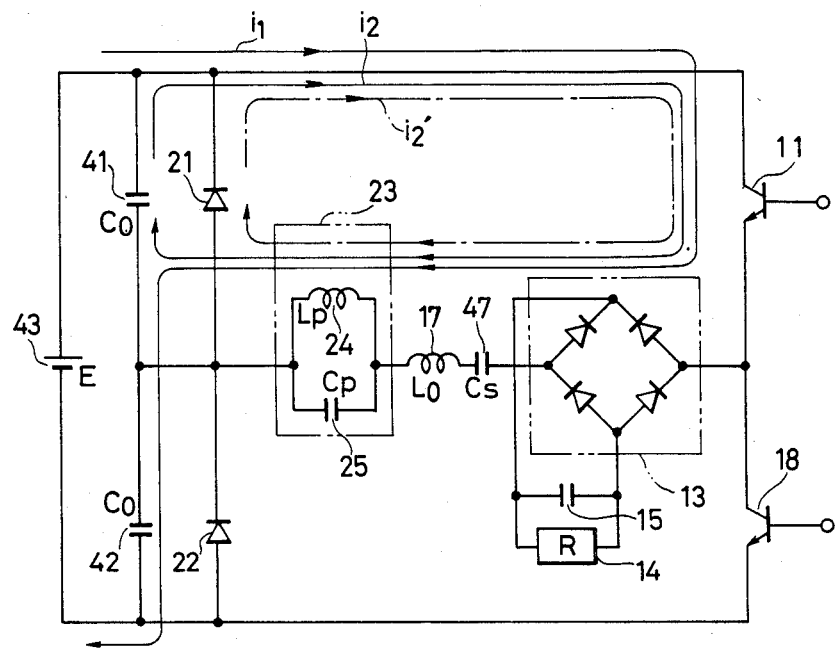
FIG. 16 is a circuit diagram showing an embodiment of both the first and second aspects of the invention.

FIG. 16 is a circuit diagram showing an embodiment of the first and second aspects of the invention applied to the prior art converter shown in FIG. 4. In FIG. 16, parts like those in FIGS. 4, 7 and 13 are designated by like reference numerals. In this embodiment, parallel resonant circuit 23 and third resonant capacitor 47 are connected in series with rectifier 13. Resonant frequency $fs=1/(2\pi\sqrt{L_0 Cs})$ provided by capacitance Cs of third resonant capacitor 47 and inductance $L_0$ of resonant inductor 17 is set to be higher than resonant frequency $fp=1/(2\pi\sqrt{LpCp})$ provided by capacitance Cp of capacitor 25 and inductance Lp of reactor 24 in parallel resonant circuit 23 and lower than resonant frequency $f_0=1/(2\pi\sqrt{2L_0C_0})$ provided by capacitance $C_0$ of resonant capacitor 41 (or 42) and inductance $L_0$ of resonant reactor 17. That is, resonant frequencies $f_0$, fp and fs are related to one another as $f_0>fs>fp$.

When semiconductor switch 11 in FIG. 16 is turned on, resonant current $i_1$ is caused to charge resonant capacitor 42 from power supply 43 through semiconductor switch 11, rectifier 13, load 14 (capacitor 15), then rectifier 13 again, then third resonant capacitor 47, resonant inductor 17 and parallel resonant circuit 23. At the same time, discharging current $i_2$ is caused to flow from resonant capacitor 41 through semiconductor switch 11, rectifier 13, load 14 (capacitor 15), then rectifier 13 again, then third resonant capacitor 47, resonant inductor 17 and parallel resonant circuit 23. Even after discharging resonant capacitor 41 to zero voltage, the resonant current $i_2$ tends to flow into capacitor 41 due to the inductance of inductor 17, thereby charging capacitor 41 in the opposite direction. Therefore, as soon as the polarity of voltage across capacitor 41 is reversed, diode 21 is given a forward bias. Thus, diode 21 connected in parallel with resonant capacitor 41 is turned on, the current that has been flowing to resonant inductor 17 turns to flow as current $i_2'$ through resonant inductor 17, parallel resonant circuit 23, diode 21, semiconductor switch 11, rectifier 13, load 14 (capacitor 15), then rectifier 13 again and then capacitor 47. This current $i_2'$ is a resonant current provided by resonant inductor 17, capacitor 25 of parallel resonant circuit 23 and third resonant capacitor 47. Since the capacitance of resonant capacitor 25 is determined by the conditions for the lowest frequency clamping, $i_2'$ can be freely set by suitably selecting the capacitance of third resonant capacitor 47. In the above way, one half cycle of operation is completed. In the next half cycle, semiconductor switch 18 is turned on to cause charging of resonant capacitor 41 and discharging of resonant capacitor 42.

Since $f_0$, fp and fs are selected such that $f_0>fs>fp$, the resonant current until the turning-on of diode 21 (or 22) is not substantially affected by third resonant capacitor 47. Resonant capacitor 47 is effective mainly after the turning-on of diode 21 (or 22) to extinguish resonant current $i_2'$ caused by resonant inductor 17. After the turning-on of diode 21 (or 22), the current $i_2'$ which has been flowing through resonant inductor 17 is consumed only in load 14. In the prior art series resonant converter such as shown in FIG. 4, even when the output voltage becomes low, the current $i_2'$ noted above does not become zero because the load is low. Therefore, the semiconductor switch is not naturally turned off, resulting in an extraordinary increase of the output current. To avoid this, the semiconductor switch has to be forcibly turned off, which gives rise to other problems as discussed before. According to the invention, the resonant current $i_2'$ after the diode 21 (or 22) has been turned on is naturally reduced to zero using the resonance between third resonant capacitor 47 and resonant inductor 17. Thus, it is possible to sufficiently limit the output current by suitably selecting the capacitance of third resonant capacitor 47 to solve the various problems noted above.

When the load is light, the operating frequency is lowered to reduce the output current. In this case, the lower limit of the operating frequency is selected to be parallel resonant frequency fp of parallel resonant circuit 23. When fp is set to a suitable value above the audible frequency range, e.g., 20 kHz, the resonant converter can be operated at a frequency higher than the audible frequency range even when the load is very light because with reduction of the operating frequency to fp the output current becomes sufficiently small.

Figure 6A:
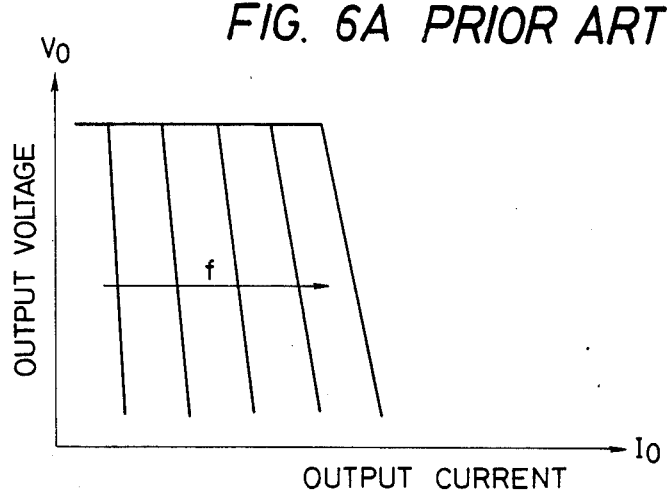
FIG. 6A is a graph showing an output voltage $V_0$ versus output current $I_0$ characteristic of the prior art series resonant converter shown in FIG. 1.
Figure 6B:
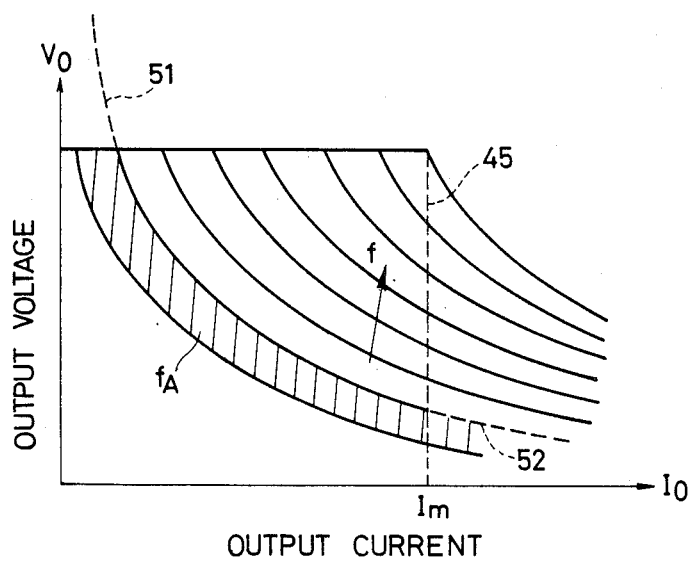
FIG. 6B is a graph showing an output voltage $V_0$ versus output current $I_0$ characteristic of the prior art series resonant converter shown in FIG. 4.

With the prior art series resonant converter shown in FIG. 4, if the lower limit of the operating frequency is set to a value above the audible frequency range for the purpose of eliminating noise, in case of a very light load, output voltage $V_0$ is extremely increased as shown by dashed line 51 in FIG. 6B. Also, in case of heavy load, output current $I_0$ is extremely increased as shown by line 52. In contrast, according to the invention, the current and voltage limiting effects equivalent to those obtainable by lowering the operating frequency down to an audible frequency with the prior art converter of FIG. 4, can be achieved without lowering the operating frequency to an audible frequency even in either case of light load operation and heavy load operation.

In the case of the embodiment shown in FIG. 16 according to both the first and second aspects of the invention, it is also possible to insulate the DC input and DC output from each other using transformer 27 as in the case of FIG. 15.

Figure 17:
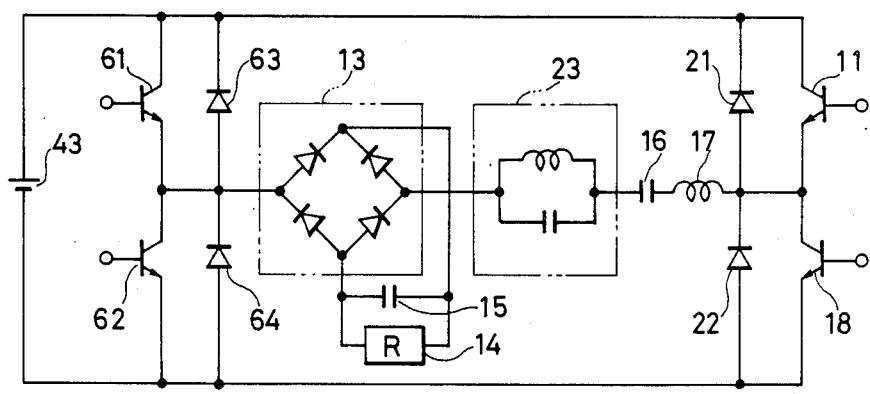
FIG. 17 is a circuit diagram showing a further embodiment of the first aspect of the invention applied to a series resonant converter, in which two switch elements are provided in each series resonant loop.

In the above case, single semiconductor switch 11 is provided in the first series resonant loop, and single semiconductor switch 18 in the second series resonant loop. However, it is also possible to provide two semiconductor switch elements in each series resonant loop and simultaneously control these two semiconductor switches. An example of such an arrangement is shown in FIG. 17. In this instance, power supply 43 is connected across a series combination of switch elements 11 and 18 and also across a series combination of switch elements 61 and 62. Diodes 63 and 64 are connected in parallel with respective switch elements 61 and 62 such that they are of the opposite polarity to the power supply 43. A series connection of parallel resonant circuit 23, resonant inductor 17, resonant capacitor 16, and rectifier 13 are connected between the connection point between switch elements 11 and 18 and the connection point between switch elements 61 and 62.

When switch elements 61 and 18 are simultaneously turned on, a series resonant current is caused to flow from power supply 43 through switch element 61, rectifier 13, load 14, then rectifier 13 again, then parallel resonant circuit 23, resonant capacitor 16, resonant inductor 17 and switch element 18 and back to power supply 43. The charged voltage across capacitor 16 reaches a peak when the charging resonant current has returned to zero, and the charge then stored in capacitor 16 is discharged as a series resonant current in the opposite direction to the previous current through a loop extending from resonant capacitor 16 through parallel resonant circuit 23, rectifier 13, load 14, diode 63, power supply 43, diode 22 and resonant inductor 17 back to resonant capacitor 16. This current is continued during this half cycle.

In the next half cycle, switch elements 18 and 61 are turned off and switch elements 11 and 62 are simultaneously turned on to bring about a similar operation. Again in this case, with a reduction of the load the repetition frequency, at which switch elements 11 and 62 are turned on and then switches 18 and 61 are simultaneously turned on, is reduced. This frequency reduction, however, is allowed only in the range above the parallel resonant frequency by resonance of parallel resonant circuit 23.

As has been described in the foregoing, according to the first aspect of the invention a parallel resonant circuit, which makes the lower limit of the operating frequency (selected to be a value above the audible frequency range) as resonant frequency, is provided in each of or commonly for the two series resonant loops. Therefore, when operating frequency is reduced to the lower limit under a very light load condition, the impedance of the series resonant loops is sufficiently increased to limit the output current. The converter thus can be used even under a very light load condition. Besides, noise is not generated, nor is wasteful current caused to occur, thereby insuring high efficiency. Further, the operating frequency range may be narrow, and the construction of the operating frequency control circuit may be simple.

According to the second aspect of the invention, a third resonant capacitor is provided for each of or commonly for the two series resonant loops, and series resonant frequency fs of the circuit constituted by the third resonant capacitor and a series resonant inductor is set to be lower than series resonant frequency $f_0$ given by series resonant inductor and series resonant capacitor. Thus, under a heavy load condition the output current can be limited without reducing the operating frequency down to the audible frequency range. It is thus possible to eliminate noise. In addition, the operating frequency control range may be narrow, and the operating frequency control circuit may have a simple construction.

Further, a series resonant converter according to both the first and second aspects of the invention will be free from noise regardless of whether the load is light or heavy and may have a narrow operating frequency control range.

What is claimed is:

1. A series resonant converter comprising:
  a first series resonant loop including a first switch element;
  a second series resonant loop including a second switch element;
  series resonant means inserted in said first and second series resonant loops and having a frequency significantly higher than an audible frequency range;
  a rectifier inserted commonly in said first and second series resonant loops in series thereto;
  power supply means for causing current through said first series resonant loop through control of said first switch element and causing current through said second series resonant loop through control of said second switch element; and
  parallel resonant means inserted in said first and second series resonant loops in series with said series resonant means and having a parallel resonant frequency significantly lower than the series resonant frequency of said first and second series resonant loops and slightly higher than the audible frequency range.

2. The series resonant converter according to claim 1, wherein said power supply means includes a first power supply provided in said first series resonant loop and a second power supply provided in said second series resonant loop, said first and second power supplies being connected in series with each other in the same polarity direction, and said rectifier being inserted in a common path connecting the junction between said first and second power supplies and the junction between said first and second switch elements.

3. The series resonant converter according to claim 2 wherein said series resonant means comprises a series resonant inductor and a series resonant capacitor which are inserted in said common path in series thereto, and said parallel resonant means is a single parallel resonant circuit inserted in said common path in series thereto.

4. The series resonant converter according to claim 1, wherein said power supply means is a single power supply connected across the series combination of said first and second switch elements.

5. The series resonant converter according to claim 4 wherein said series resonant means comprises first and second series resonant capacitors inserted in said first and second series resonant loops, respectively, and connected in series across said power supply, and a series combination of said rectifier and said parallel resonant circuit is inserted in a common path connecting between the junction of said first and second series resonant capacitors and the junction of said first and second switch elements.

6. The series resonant converter according to claim 5 wherein said series resonant means comprises a series resonant inductor inserted in said common path in series with said rectifier.

7. The series resonant converter according to claim 4 wherein said parallel resonant means and said series resonant means are a single parallel resonant circuit and a single series resonant circuit, respectively, and said parallel resonant circuit, said series resonant circuit, and said rectifier are connected in series between the junction of said first and second switch elements and one terminal of said power supply.

8. The series resonant converter according to claim 1, 2, 3, 4, 5, 6 or 7 which further comprises first and second diodes connected in parallel with said respective first and second switch elements such that they are of the opposite polarity to said power supply means.

9. The series resonant converter according to claim 1, wherein said power supply means is a single power supply, said series resonant means comprises first and second series resonant capacitors connected in series across said power supply, said first and second switch elements are connected in series across said power supply, first and second diodes are connected in parallel with said respective first and second series resonant capacitors such that they are of the opposite polarity to said power supply, and said rectifier is inserted in a common path connecting between the junction between said first and second series resonant capacitors and the junction between said first and second switch elements.

10. The series resonant converter according to claim 9, wherein said parallel resonant means is a single parallel resonant circuit inserted in said common path, and said series resonant means comprises a series resonant inductor inserted in said common path in series with said rectifier and said parallel resonant circuit.

11. The series resonant converter according to claim 1 wherein said power supply means is a single power supply, said parallel resonant means is a single parallel resonant circuit, said series resonant means comprises a series resonant capacitor and first and second series resonant inductors constituting first and second primary windings of a transformer inserted in said first and second series resonant loops in series connection with said first and second switch elements, respectively, said parallel resonant circuit and said series resonant capacitor are connected in series between one terminal of said power supply and the junction between the series connection of said first switch element and said first primary winding and the series connection of said second switch element and said second primary winding, and said rectifier is connected to the secondary winding of said transformer.

12. The series resonant converter according to claim 5 or 6, wherein first and second diodes are connected in parallel with respective said first and second series resonant capacitors such that they are opposite polarity to said power supply.

13. A series resonant converter comprising:
a first series resonant loop including in series thereto a first series resonant capacitor and a first switch element;
a second series resonant loop including in series thereto a second series resonant capacitor and a second switch element, said first and second series resonant capacitors being connected in series to each other, said first and second switch elements being connected in series to each other;
series resonant inductor means inserted in said first and second series resonant loops for providing, in combination with said first and second series resonant capacitors, first and second series resonant means of substantially identical first series resonant frequency fo, respectively;
a power supply connected across the series connection of said first and second switch elements and also connected across the series connection of said first and second series resonant capacitors;
first and second diodes connected in parallel with said first and second series resonant capacitors, respectively, such that the polarity of each of said first and second diodes is opposite to the polarity of said power supply;
a rectifier provided commonly for said first and second series resonant loops and inserted in a common path connecting between the junction of said first and second series resonant capacitors and the junction of said first and second switch elements; and
third series resonant capacitor means inserted in said first and second series resonant loops for providing, in combination with said series resonant inductor means, third series resonant means of a second series resonant frequency fs lower than said first series resonant frequency fo of said first and second series resonant means.

14. The series resonant converter according to claim 13, wherein said third series resonant capacitor means is a single capacitor inserted in said common path in series with said rectifier.

15. The series resonant converter according to claim 14, wherein said series resonant inductor means is a common resonant inductor inserted in said common path in series to said rectifier.

16. The series resonant converter according to claim 13, 14 or 15 which further comprises parallel resonant means provided for said first and second resonant loops and having a resonant frequency fp lower than said first series resonant frequency $f_0$ and higher than the audible frequency range.

17. The series resonant converter according to claim 16, wherein said parallel resonant means is a single parallel resonant circuit inserted in said common path in series with said rectifier.

18. The series resonant converter according to claim 1, 3, 5, 7, 9, 13 or 14, wherein said rectifier is connected through a transformer so that DC input and DC output are insulated from each other.

19. The series resonant converter according to claim 1, wherein said power supply means is a single power supply connected across a series combination of said first and second switch elements, said power supply being also connected across a series combination of a third switch element controlled simultaneously with said second switch element and a fourth switch element controlled simultaneously with said first switch element, said rectifier being connected between the junction of said first and second switch elements and the junction of said third and fourth switch elements.

20. The series resonant converter according to claim 19, wherein first to fourth diodes are connected in parallel with respective one of said first to fourth switch elements in opposite polarity to said power supply.

* * * * *